United States Patent
Qin

(10) Patent No.: US 11,521,303 B2
(45) Date of Patent: Dec. 6, 2022

(54) METHOD AND DEVICE FOR INPAINTING IMAGE

(71) Applicant: Beijing Dajia Internet Information Technology Co., Ltd., Beijing (CN)

(72) Inventor: Wenyu Qin, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 201 days.

(21) Appl. No.: 17/025,617

(22) Filed: Sep. 18, 2020

(65) Prior Publication Data

US 2021/0004940 A1 Jan. 7, 2021

(30) Foreign Application Priority Data

Sep. 19, 2019 (CN) .......................... 201910889206.7

(51) Int. Cl.
*G06T 5/00* (2006.01)
*G06T 5/20* (2006.01)

(52) U.S. Cl.
CPC .............. *G06T 5/005* (2013.01); *G06T 5/20* (2013.01)

(58) Field of Classification Search
CPC . G06T 5/005; G06T 5/20; G06T 2207/20221; G06T 2207/30201; G06T 7/529; G06V 40/162

See application file for complete search history.

(56) References Cited

U.S. PATENT DOCUMENTS

| 8,345,114 B2* | 1/2013 | Ciuc | G06T 11/60 348/222.1 |
| 8,498,456 B2* | 7/2013 | Legagneur | G06T 11/60 382/118 |
| 9,256,950 B1* | 2/2016 | Xu | G06V 40/171 |
| 9,547,908 B1* | 1/2017 | Kim | G06V 40/162 |
| 10,972,709 B2* | 4/2021 | Bao | G06T 5/001 |
| 11,335,122 B2* | 5/2022 | Velusamy | G06T 5/002 |
| 2010/0007726 A1* | 1/2010 | Barbieri | G06V 40/193 348/78 |
| 2015/0358535 A1* | 12/2015 | Ciuc | G06T 5/002 348/239 |

FOREIGN PATENT DOCUMENTS

| CN | 102117481 A | 7/2011 |
| CN | 106056546 A | 10/2016 |
| CN | 110136080 A | 8/2019 |

* cited by examiner

*Primary Examiner* — Andrae S Allison
(74) *Attorney, Agent, or Firm* — Knobbe, Martens, Olson & Bear, LLP

(57) ABSTRACT

A method and device are provided for inpainting image. An electronic device can be used for: determining an inpainting region of the image, wherein the inpainting region includes a defective region; obtaining original texture information of the inpainting region; determining inpainting pixel blocks and backup pixel blocks, wherein the inpainting pixel blocks include inpainting pixels and first type pixels; inpainting all inpainting pixels of the inpainting pixel blocks based on the backup pixel blocks; and superimposing the original texture information in the inpainting region.

17 Claims, 4 Drawing Sheets

METHOD AND DEVICE FOR INPAINTING IMAGE

CROSS REFERENCE TO RELATED APPLICATIONS

This application is based on and claim priority under 35 U.S.C. 119 to Chinese Patent application No. 201910889206.7, filed on Sep. 19, 2019, in the China National Intellectual Property Administration, the disclosures of which is herein incorporated by reference in its entirety.

FIELD

The disclosure relates to the technical field of image processing, and particularly to a method and device for inpainting image and a storage medium.

BACKGROUND

The image processing technique of portrait beautification is more and more widely used in daily life. In order to make human skin in the image become smooth and delicate, it needs to remove some defectives, such as cane, moles and spots, for inpainting the image.

SUMMARY

According to a first aspect of an embodiment of the disclosure, a method for inpainting image is provided. The method includes: determining an inpainting region of the image, wherein the inpainting region includes a defective region; obtaining original texture information of the inpainting region; determining inpainting pixel blocks and backup pixel blocks, wherein the inpainting pixel blocks include inpainting pixels and first type pixels; inpainting all inpainting pixels of the inpainting pixel blocks based on the backup pixel blocks; superimposing the original texture information in the inpainting region; wherein the backup pixel blocks are determined in a region outside the inpainting region within the image, and the first type pixels include region edge pixels on the outside of the inpainting region and inpainted pixels.

According to an embodiment of the disclosure, said inpainting all inpainting pixels of the inpainting pixel blocks based on the backup pixel blocks includes: in response to that the inpainting pixel blocks include the inpainted pixels, inpainting again the inpainted pixels by weighting pixel values of pixels in the backup pixel blocks and pixel values of the inpainted pixels.

According to an embodiment of the disclosure, said inpainting all inpainting pixels of the inpainting pixel blocks based on the backup pixel blocks includes: inpainting non-inpainted pixels in the inpainting pixel blocks based on pixel values of pixels in the backup pixel blocks.

According to an embodiment of the disclosure, said determining the inpainting pixel blocks includes: determining the first type pixels of the inpainting pixel blocks based on first type pixels in a previous inpainted pixel block and a preset order of the inpainting pixels; determining whether the first type pixels have been inpainted; in response to that the first type pixels have been inpainted, redetermining the first type pixels in the inpainting pixel block; and in response to that the first type pixels do not have been inpainted, determining the inpainting pixel blocks.

According to an embodiment of the disclosure, said determining the back pixel blocks includes: determining a first number of the inpainting pixels in the inpainting region; determining a second number based on the first number, wherein the second number is larger than the first number; determining a local region based on the second number, wherein the local region includes the inpainting region and includes the second number of pixels; determining the backup pixel blocks in a region outside the inpainting region in the local region.

According to an embodiment, said determining the backup pixel blocks includes: determining multiple candidate pixel blocks with same size of the inpainting pixel blocks in the region outside the inpainting region within the image; determining a similarity of each candidate pixel block to the inpainting pixel block; and determining the backup pixel block based on the candidate pixel block with a highest similarity.

According to an embodiment of the disclosure, said determining the similarity of each candidate pixel block to the inpainting pixel block includes: determining pixel values of second type pixels in the inpainting pixel block based on pixel values of third type pixels in the inpainting pixel block, wherein the second type pixels are non-inpainted pixels among the inpainting pixels in the inpainting pixel block, and the third type pixels are pixels other than the second type pixels in the inpainting pixel block; determining a first feature vector of the inpainting pixel block based on the pixel values of the second type pixels and the pixel values of the third type pixels; obtaining a second feature vector of the candidate pixel block based on pixel values of pixels in the candidate pixel block; and determining the similarity based on the first feature vector and the second feature vector.

According to an embodiment of the disclosure, said determining the backup pixel blocks includes: determining the backup pixel blocks with an edge strength smaller than preset edge threshold.

According to an embodiment of the disclosure, said superimposing the original texture information in the inpainting region includes: superimposing the original texture information in the inpainting region based on a pixel matrix, a texture matrix, and a preset superposition coefficient, wherein a value of each element in the pixel matrix is a pixel value of a pixel located at a same position as said element in the inpainting region, and a value of each element in the texture matrix is an original texture information of an inpainting pixel located at a same position as said element in the inpainting region.

According to a second aspect of an embodiment of the disclosure, a device for inpainting image is provided. The device includes: a processor; and a memory configured to store instructions executable by the processor. The processor is configured to execute the instructions to: determine an inpainting region of the image, wherein the inpainting region includes a defective region; obtain original texture information of the inpainting region; determine inpainting pixel blocks and backup pixel blocks, wherein the inpainting pixel blocks includes inpainting pixels and first type pixels; inpaint all inpainting pixels of the inpainting pixel blocks based on the backup pixel blocks; superimpose the original texture information in the inpainting region; wherein the backup pixel blocks are determined in a region outside the inpainting region within the image, and the first type pixels include region edge pixels on the outside of the inpainting region and inpainted pixels.

According to an embodiment of the disclosure, the processor is configured: in response to that the inpainting pixel blocks includes the inpainted pixels, to inpaint again the inpainted pixels by weighting pixel values of pixels in the backup pixel blocks and pixel values of the inpainted pixels.

According to an embodiment of the disclosure, the processor is configured to: inpaint non-inpainted pixels in the inpainting pixel blocks based on pixel values of pixels in the backup pixel blocks.

According to an embodiment of the disclosure, the processor is configured to: determine the first type pixels of the inpainting pixel blocks based on first type pixels in a previous inpainted pixel block and a preset order of the inpainting pixels; determine whether the first type pixels have been inpainted; in response to that the first type pixels have been inpainted, redetermine the first type pixels in the inpainting pixel block; and in response to that the first type pixels do not have been inpainted, determine the inpainting pixel blocks.

According to an embodiment of the disclosure, the processor is configured to: determine a first number of the inpainting pixels in the inpainting region; determine a second number based on the first number, wherein the second number is larger than the first number; determine a local region based on the second number, wherein the local region includes the inpainting region and includes the second number of pixels; determine the backup pixel blocks in a region outside the inpainting region in the local region.

According to an embodiment of the disclosure, the processor is configured to: determine multiple candidate pixel blocks with same size of the inpainting pixel blocks in the region outside the inpainting region within the image; determine a similarity of each candidate pixel block to the inpainting pixel block; and determine the backup pixel block based on the candidate pixel block with a highest similarity.

According to an embodiment of the disclosure, wherein the processor is configured to: determine pixel values of second type pixels in the inpainting pixel block based on pixel values of third type pixels in the inpainting pixel block, wherein the second type pixels are non-inpainted pixels among the inpainting pixels in the inpainting pixel block, and the third type pixels are pixels other than the second type pixels in the inpainting pixel block; determine a first feature vector of the inpainting pixel block based on the pixel values of the second type pixels and the pixel values of the third type pixels; obtain a second feature vector of the candidate pixel block based on pixel values of pixels in the candidate pixel block; and determine the similarity based on the first feature vector and the second feature vector.

According to an embodiment of the disclosure, wherein the processor is configured to: determine the backup pixel blocks with an edge strength smaller than preset edge threshold.

According to an embodiment of the disclosure, wherein the processor is configured to: superimpose the original texture information in the inpainting region based on a pixel matrix, a texture matrix, and a preset superposition coefficient, wherein a value of each element in the pixel matrix is a pixel value of a pixel located at a same position as said element in the inpainting region, and a value of each element in the texture matrix is an original texture information of an inpainting pixel located at a same position as said element in the inpainting region.

According to a second aspect of an embodiment of the disclosure, a computer readable storage medium is provided. The computer readable storage medium stores computer programs that, when executed by a processor, cause the processor to perform the operation of: determining an inpainting region of the image, wherein the inpainting region includes a defective region; obtaining original texture information of the inpainting region; determining inpainting pixel blocks and backup pixel blocks, wherein the inpainting pixel blocks include inpainting pixels and first type pixels; inpainting all inpainting pixels of the inpainting pixel blocks based on the backup pixel blocks; superimposing the original texture information in the inpainting region; wherein the backup pixel blocks are determined in a region outside the inpainting region within the image, and the first type pixels include region edge pixels on the outside of the inpainting region and inpainted pixels.

BRIEF DESCRIPTION OF THE DRAWINGS

The accompanying drawings herein are incorporated into the description and form a part of the description, show embodiments conforming to the disclosure, are used together with the description to explain the principles of the disclosure, and do not constitute an improper limitation to the disclosure.

DETAILED DESCRIPTION

In order to make the skilled in the art better understand technical solutions of the disclosure, a clear and complete description will be given below on the technical solutions in the embodiments of the disclosure in combination with accompanying drawings.

It should be noted that, the terms "first", "second" and the like in the description, the claims and the above appended drawings of the present disclosure are used to distinguish similar objects and need not be used to describe a specific order or sequence. It should be understood that, the data used in this way can be interchangeable where appropriate, so that the embodiments of the disclosure described herein can be implemented in an order other than those depicted or described herein. The embodiments described in the following embodiments do not represent all the embodiments consistent with the disclosure. Instead, the embodiments are only examples of devices and methods which are consistent with some aspects of the disclosure as detailed in the attached claims.

Figure 1:
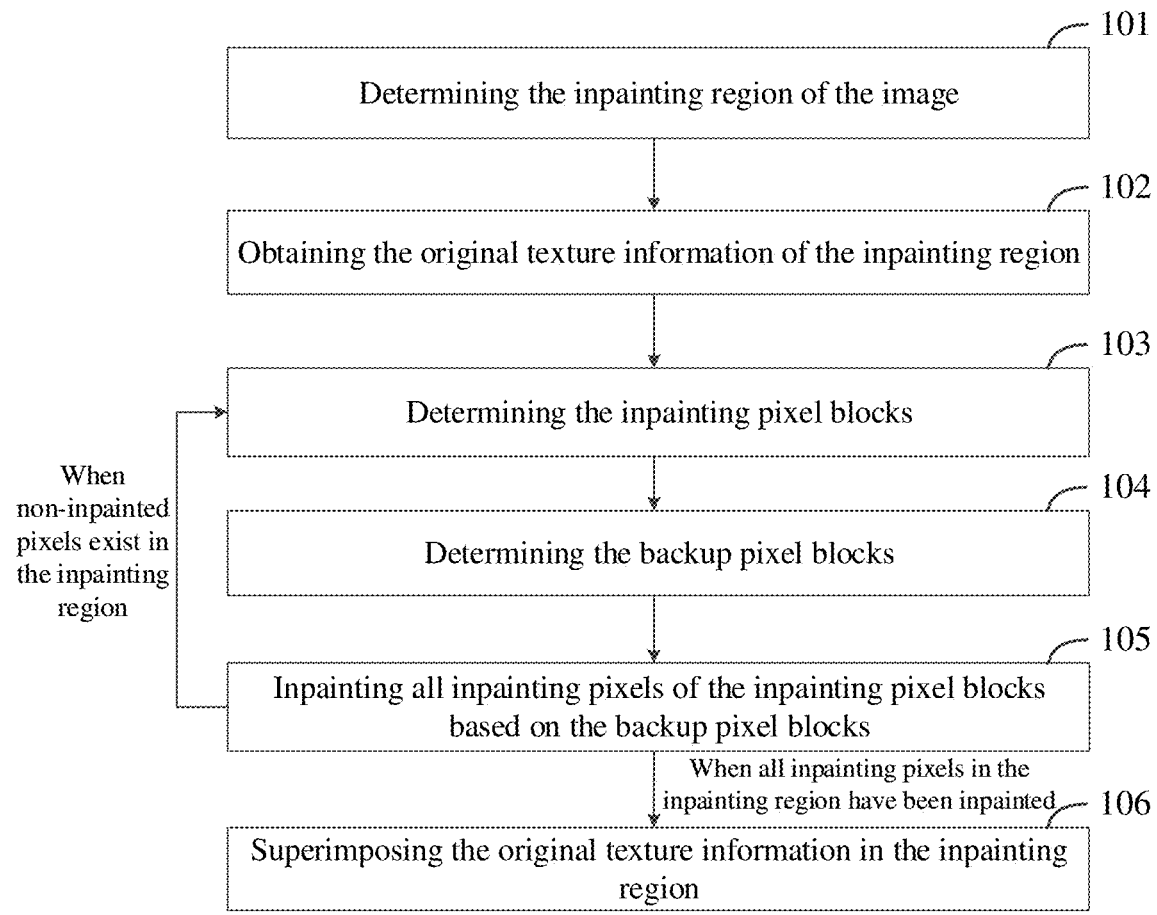
FIG. 1 is a flow chart of a method for inpainting an image according to an embodiment of the disclosure.

FIG. 1 is a flow chart of a method for inpainting an image according to an embodiment. The method can be performed by an electronic equipment, and the electronic equipment can be a server or a smart phone, etc. As shown in FIG. 1, the method includes the following step 101 to step 106.

Step 101: determining the inpainting region of the image.

The inpainting region of the image can be the region where defects of the image are located. For example, in the portrait image, the region where the defects such as acne, moles and spots on the human skin are located in the image can be determined as the inpainting region.

In an embodiment of the disclosure, the image can be detected to obtain the region where the defects of the image are located, and the region is determined as the inpainting region. Specifically, the image can be detected by utilizing the image salient region detection algorithm, whether a region is the defective region is determined based on the color features, texture features and brightness features of the detected region. If the detected region is the defective region, then the detected region is determined as the inpainting region, where the image salient region detection algorithm can be a region contrast algorithm and a color contrast algorithm.

In some embodiments of the disclosure, a region selected by a user can also be acquired and determined as the inpainting region.

Step 102: obtaining the original texture information of the inpainting region.

The original texture information of the inpainting region can be represented by gradient values of pixel values between each pixel and surrounding pixels in the inpainting region, and the original texture information can be represented by such forms as a set, a sequence, or a matrix.

In some embodiments of the disclosure, when an edge detection operator is adopted to detect an image edge, the gradient values of the pixels of the image can be calculated, therefore, the edge detection operator can be utilized to process the inpainting region, to obtain the texture information of the inpainting region. The above edge detection operator can be a Sobel operator or a Robert operator, etc.

Step 103: determining the inpainting pixel blocks, wherein the inpainting blocks include the inpainting pixels and the first type pixels.

The first type pixels include: the region edge pixels on the outside of the inpainting region and/or the inpainted pixels. The inpainting pixels are the pixels to be inpainted in the inpainting region, and the region edge pixels are the pixels on the outside edge of the inpainting region. Specifically, the outside edge of the inpainting region can be an edge formed by the pixels which do not belong to the inpainting region and which are adjacent to the inpainting region.

In some embodiments of the disclosure, the position of the inpainting pixel block can be determined based on the position of the first type pixels. Specifically, the position of the inpainting pixel block can be determined with the first type pixel as the center of the inpainting pixel block, and the position of the inpainting pixel block can also be determined with the first type pixel as the vertex of the inpainting pixel block, wherein the vertex can be a vertex at the upper left corner of the inpainting pixel block, a vertex at the upper right corner of the inpainting pixel block or a vertex at the lower right corner of the inpainting pixel block, and so on.

Figure 2:
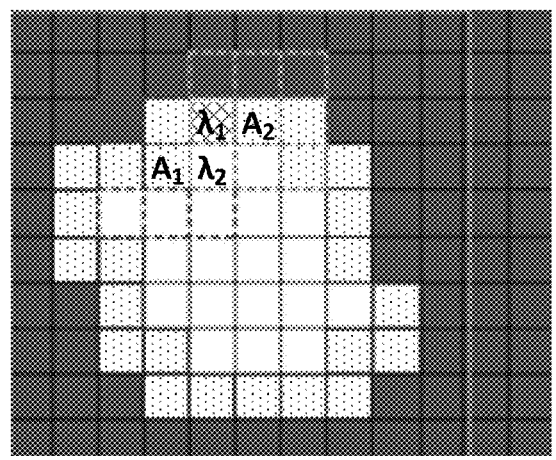
FIG. 2 is schematic diagram of a pixel block according to an embodiment of the disclosure.

In some embodiments of the disclosure, the inpainting pixel block can be a square with a preset side length, wherein the preset side length can be three pixels, five pixels, seven pixels, etc. The inpainting pixel block can also be a rectangle, a polygon, etc., which is not limited in the disclosure. For example, as shown in FIG. 2, the blank white region of the image is an inpainting region, and the dot white region is the region edge pixels of the inpainting region. One inpainting pixel block can be obtained with pixel A1 in the region edge pixels of the inpainting region as the central point of the inpainting pixel block and with three pixels as a side length of a square, wherein the pixels at the bottom and right side of the pixel block are the inpainting pixels.

In some embodiments, the inpainting pixel blocks may further include other pixels not belonging to the inpainting region, in addition to the inpainting pixels and the above first type pixels.

In some embodiments of the disclosure, when the inpainting pixel blocks are determined, the inpainting pixel blocks can be determined according to a preset order. Specifically, the inpainting pixel blocks can be firstly determined along the region edge pixels of the inpainting region according to a clockwise and/or counterclockwise order, and then determined by approaching the center of the inpainting region layer by layer. The inpainting pixel blocks in the region to be inpainted can also be determined row by row according to an order from top to down; and the inpainting pixel blocks in the inpainting region can also be determined column by column according to an order from left to right, which is not limited in the disclosure.

Step 104: determining backup pixel blocks; wherein the backup pixel blocks are determined in a region outside the inpainting region within the image.

The shape of the backup pixel block is the same as that of the inpainting pixel block.

In some embodiments, the backup pixel block can be determined according to similarity. The pixel block with a similarity to the inpainting pixel block being higher than a preset threshold can be selected in the region outside the inpainting region within the image as a backup pixel block. Alternatively, a pixel block with the highest similarity to the inpainting pixel block can also be selected from the region outside the inpainting region within the image as a backup pixel block. The above similarity can be color similarity, and can also be texture similarity, which is not limited in the disclosure.

Step 105: inpainting all inpainting pixels of the inpainting pixel blocks based on the backup pixel blocks.

In some embodiments, when all inpainting pixels in the inpainting region have been inpainted, the method proceeds to the step 106, and when non-inpainted pixels exist in the inpainting region, the method returns to step 103, until all inpainting pixels have been inpainted.

In some embodiments, said steps 103, 104 and 105 can be circularly executed, i.e., determining an inpainting pixel block, determining the backup pixel block, then inpainting pixels of the inpainting pixel block based in the backup pixel block, and returning to the previous step 103, until all inpainting pixels in the inpainting region are inpainted.

In some embodiments of the disclosure, when inpainting the inpainting pixel block, the pixels in the inpainting pixel block can be filled with pixel values of the pixels in the backup pixel block, so as to inpaint the inpainting pixel block. In this way, when inpainting the inpainting pixel block, pixel value filling can be directly performed on all pixels of the inpainting pixel block, that is, the pixel values of all pixels of the inpainting pixel block are set to be the pixel values of the pixels of the backup pixel block, thereby saving computing resources and accelerating inpainting efficiency.

In some embodiments of the disclosure, when the inpainting pixel block includes an inpainted pixel, since such pixel is no longer a pixel which is completely non-inpainted, and has an inpainted pixel value, therefore the inpainted pixel can be inpainted again by weighting the pixel value of the pixel in the backup pixel block and the pixel value of the inpainted pixel, such that the pixel value of such pixel can be determined by combining the pixel values of more pixels around it. In addition, for the non-inpainted pixels in the inpainting pixel block, the non-inpainted pixel can be inpainted based on the pixel value of the pixel in the backup pixel block. In this way, when inpainting the inpainting pixel block, the pixel value of the inpainted pixel in the inpainting pixel block is a value obtained by combining the pixel values of multiple different pixels, such that the inpainted pixel is smoother and less abrupt.

Since the inpainting pixel block contains multiple pixels, the common pixels may exist between different pixel blocks. Thus when inpainting some inpainting pixel block, the inpainting pixel block may include one or more inpainted pixels. For example, as shown in FIG. 2, in an inpainting pixel block with A2 as the center and three pixels as the side length of a square, the pixel $\lambda 1$ has been inpainted, therefore, $\lambda 1$ is the inpainted pixel.

In some embodiments, pixel value can be calculated based on the following formula: $S=a*S1+b*S2$. Where S1 is the current pixel value of the inpainted pixel, a is a first preset weight, and S2 is the pixel value of the pixel in the backup pixel block. Specifically, S2 can be the pixel value of the pixel at the same position in the backup pixel block, or can also be a pixel value obtained through calculation of all the pixels in the backup pixel block, and b is a second preset weight. The sum of a and b is 1, and the value of a can be 0.3, 0.5 and 0.7, etc.

In some embodiments of the disclosure, when inpainting the inpainted pixel in the inpainting pixel block, the pixel value of the inpainted pixel can be obtained by weighting a pixel value of the inpainted pixel in the inpainting pixel block and the pixel value of the pixel at the same position in the backup pixel block.

The pixels at the same position can be understood as the pixels at the same positions in the pixel blocks. For example, a specific pixel is located in the second row and the third column in the inpainting pixel block, then the pixel located in the second row and the third column of the backup pixel block is the pixel with the same position in the backup pixel block.

In some embodiments of the disclosure, when inpainting non-inpainted pixel in the inpainting pixel block, the pixel value of the non-inpainted pixel in the inpainting pixel block can be set to a pixel value of the pixel with the same position in the backup pixel block. In this way, since the backup pixel block includes pixels at same positions as all pixels in the inpainting pixel block, when inpainting the inpainting pixel block based on the backup pixel block, the pixels in the inpainting pixel block can be inpainted in a one-to-one corresponding manner according to the pixels in the backup pixel block.

In some embodiments of the disclosure, an equalizing pixel value of the backup pixel block can be determined based on the pixel value of each pixel in the backup pixel block, and then the pixel value of each non-inpainted pixel in the inpainting pixel block is set to the equalizing pixel value. The equalizing pixel value can be an average value of the pixel values of all pixels in the backup pixel block, and can also be a value obtained by weighting the pixel values of all pixels in the backup pixel block.

In some embodiments of the disclosure, when the inpainting pixel block includes the inpainted pixel, the pixel value of the inpainted pixel can be determined by weighting the equalizing pixel value and the pixel value of the inpainted pixel; and the pixel value of the non-inpainted pixel is set to the equalizing pixel value.

Step 106: superimposing the original texture information in the inpainting region.

In some embodiments of the disclosure, the original texture information can be superimposed in the inpainting region based on a pixel matrix, a texture matrix and a preset superposition coefficient. The original texture information can be superimposed in the inpainting region by the following formula: $Y=X+\beta*T$.

Where X is a pixel matrix, the value of each element in the pixel matrix is a pixel value of a pixel located at the same position as the element in the inpainting region, $\beta$ represents a preset superposition coefficient, T represents a texture matrix, and a value of each element in the texture matrix is an original texture information of an inpainting pixel located at the same position as the element in the inpainting region. The value of $\beta$ can be preset according to application scenarios and empirical values of experiments.

In some embodiments of the disclosure, edge smoothing process is performed on the inpainting region firstly, and then original texture information is superimposed in the inpainting region after edge smoothing process. The edge smoothing process can be Gaussian smoothing, mean smoothing, etc. In this way, the edge smoothing process can offset edges between inpainted pixel blocks, such that the inpainted image is smooth and natural.

When inpainting the image with image inpainting solution according to the above embodiment, the inpainting region of the image is determined, the original texture information of the inpainting region is obtained, and then the steps of determining the inpainting pixel blocks, determining backup pixel blocks, configured to inpaint the inpainting pixel blocks, and inpainting pixels in the inpainting pixel block based on the backup pixel block are performed, until all inpainting pixels in the inpainting region are inpainted, and then the texture information is superimposed in the inpainting region. In one aspect, in the solution according to the embodiment of the disclosure, the inpainting region of the image is inpainted through inpainting the pixel block as a whole, and the original texture in the pixel block can be retained. In another aspect, in the solution according to the embodiment of the disclosure, texture information is superimposed in the inpainting region, such that the texture of the inpainting region is strong in sense of reality. Thus, when the image is inpainted with the image inpainting solution according to the embodiment of the disclosure, the texture of the inpainted image is rich and the sense of reality is strong.

In an embodiment of the disclosure, after the above step 104, color equalization process can also be performed on the inpainting region after the texture information is superimposed. Specifically, a Poisson cloning algorithm and a white balance algorithm can be adopted to perform color equalization process on the inpainting region. In this way, the color of the inpainting region is more equalizing, thereby offsetting the pixels with abrupt colors, eliminating inpainting traces, and making the image more beautiful.

In some embodiments, the inpainting pixel block can be determined by the solutions according to the following embodiments. The first type pixels in the inpainting pixel block can be determined according to the first type pixels in a previous inpainted pixel block and a preset order of the inpainting pixels; it is judged whether the determined first type pixels have been inpainted in a preset number of inpainted pixel blocks previous, if so, the first type pixels in the inpainting pixel block is redetermined based on the determined first type pixels and the preset order, and return to the step of judging whether the determined first type pixels have been inpainted; and if not, then determine the inpainting pixel block which includes the inpainting pixels in the inpainting region and the determined first type pixels. In some embodiments, the value of the preset number can be determined according to the size of the inpainting pixel block. The above preset number can also be a preset fixed value. For example, the above preset number can be 2, 3, etc.

In some embodiments, when a previous inpainting pixel block is inpainted, the first type pixels in the current inpainting pixel block may also be inpainted. To reduce repeat inpainting and improve the inpainting efficiency, during the determining of the inpainting pixel block, the selection of the first type pixel can avoid the inpainted pixels in the preset number of previous inpainted pixel blocks. While the value of the preset number can be determined based on the size of the inpainting pixel block. The bigger the inpainting pixel block, the more the inpainted pixels during inpainting, therefore, the more the inpainted pixel blocks needing to be avoided; the smaller the inpainting pixel block, the less the inpainted pixels during inpainting, therefore, the less the inpainted pixel blocks needing to be avoided.

As shown in FIG. 2, the pixel block with the first type pixel A1 as the center is the previous inpainted pixel block, and the inpainting pixel block is a square with the side length being three pixels, therefore, the above preset number is determined to be 1, the preset order is a clockwise order, and the first type pixel in the inpainting pixel block can be determined to $\lambda 1$ based on the pixel A1 and the clockwise order. Since the side length of the inpainting pixel block is three pixels, it can be known from judgment that $\lambda 1$ has been inpainted in the previous inpainted pixel block, therefore, A2 is redetermined to be the first type pixel in the inpainting pixel block. It can be known from re-judgment that, A2 is not inpainted when the previous inpainted pixel block is inpainted, therefore, the inpainting pixel block including the inpainting pixels and the first type pixel A2 can be determined.

In some embodiments, the backup pixel block can be determined by the following solutions.

In some embodiments of the disclosure, the backup pixel block can be determined in the region outside the inpainting region within the whole image range; or a local region can also be firstly determined, and then a backup pixel block is determined in the region outside the inpainting region in the local region. The area of the local region is larger than the area of the inpainting region, and the local region includes the inpainting region. In this way, the local region approaches the inpainting region, thereby facilitating obtaining the backup pixel block in the local region, saving the computing resources, and accelerating the inpainting efficiency. In order to avoid the condition in which the pixel of the inpainting region is inpainted by adopting the pixels in the inpainting region, the backup pixel block needs to be determined in the region outside the inpainting region to be inpainted.

Specifically, the area of the pixel region can be represented by the number of the pixels in the pixel region, that is, the number of the pixels in the local region is larger than the number of the pixels in the inpainting region. The inpainting region can be located in the central position of the local region, and can also be located in the edge position of the local region, and the specific position can be determined according to the position of the inpainting region of the image. The shape of the local region can be a square, or a rectangle, or has a shape similar to the inpainting region, which is not defined in the disclosure.

Figure 3:
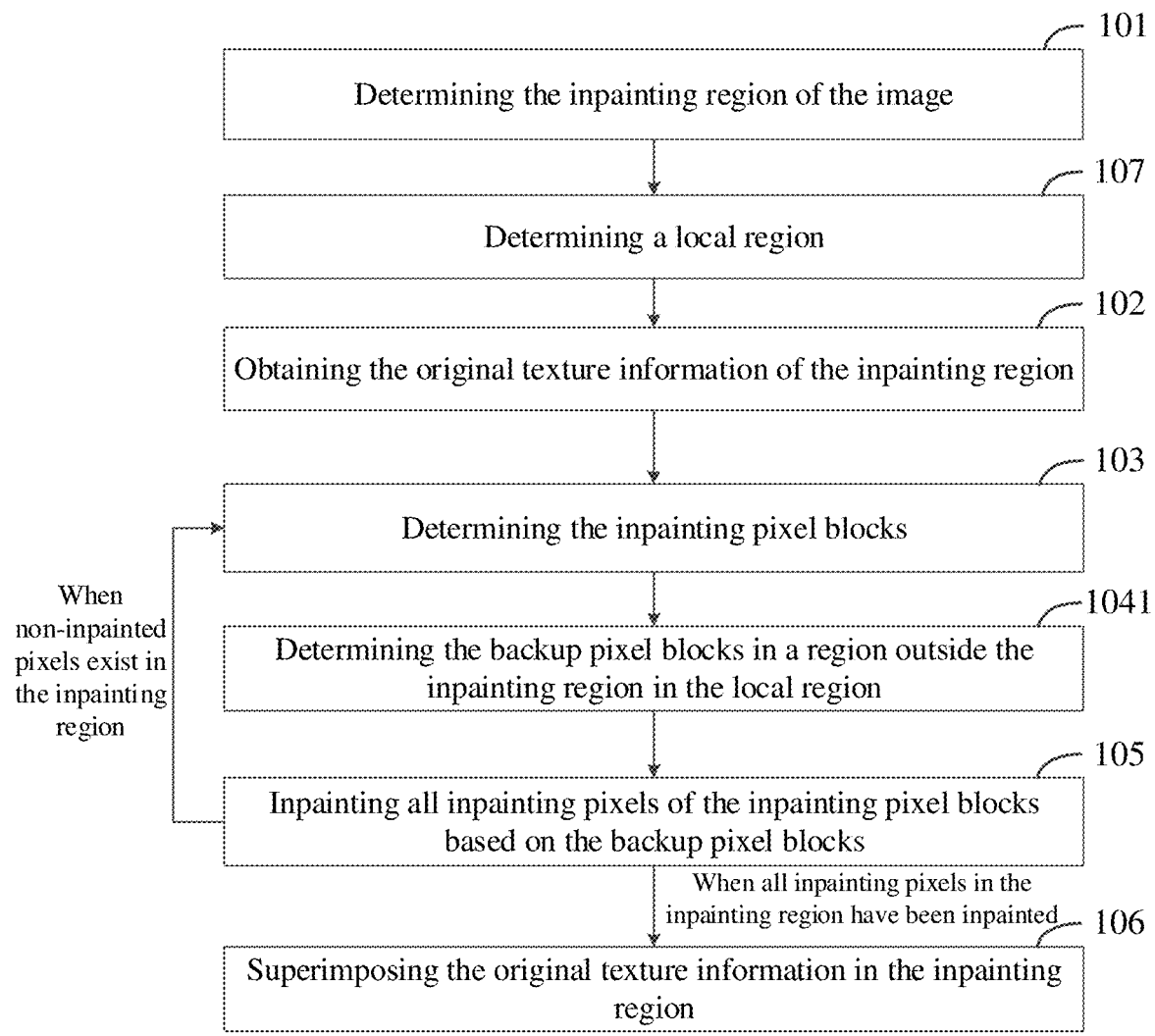
FIG. 3 is a flow diagram of another method for inpainting an image according to an embodiment of the disclosure.

FIG. 3 is a flow diagram of another method for inpainting an image according to some embodiments of the disclosure.

In some embodiments, after determining the inpainting region of the image, the method further includes step 107. The step 107 includes: determining the first number of the inpainting pixels in the inpainting region; determining the second number based on the first number, wherein the second number is larger than the first number; determining a local region based on the second number; where the local region includes the inpainting region and the local region includes the second number of pixels, the second number is larger than the first number.

In some embodiment, the second number can be a preset multiple of the first number; the second number can also be the sum of the first number and the preset difference; or the second number can also be determined based on the range of the first number. For example, when the first number is less than 32 pixels, the second number can be 128 pixels; when the first number is larger than or equal to 32 pixels and less than 64 pixels, the second number can be 256 pixels. The area of the local region can be determined based on the second number, and the local region can be further determined according to the position and shape of the local region.

In some embodiments of the disclosure, the edge of the inpainting region can also extend along the direction of the edge, to obtain a local region. The extending can be an extension by a preset distance, and can also be an extension by a preset extension multiple, which is not defined in the disclosure.

Correspondingly, said determining backup pixel blocks can further include step 1041: determining the backup pixel blocks in a region outside the inpainting region in the local region.

Figure 4:
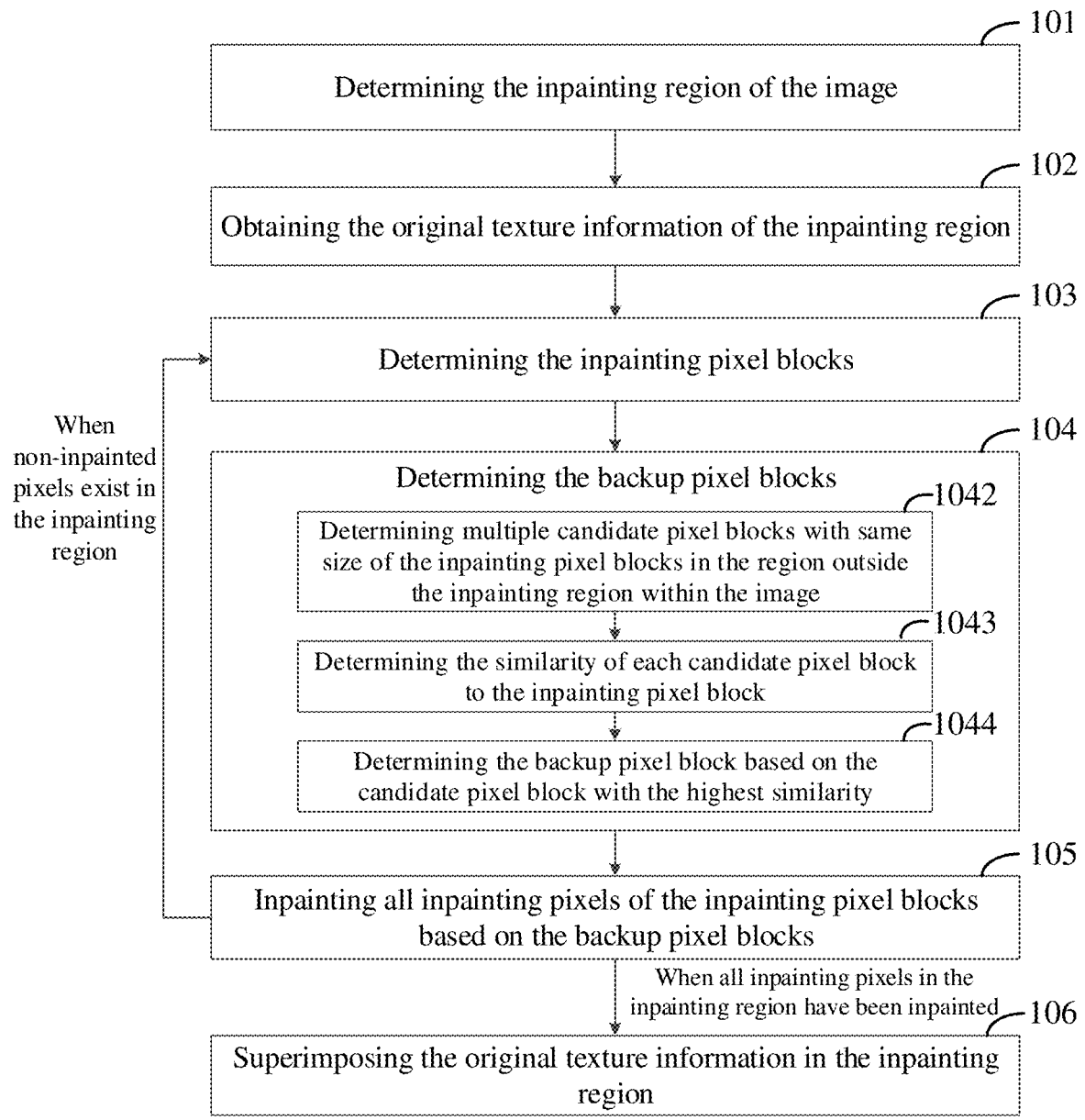
FIG. 4 is a flow diagram of a method for determining a backup pixel block according to an embodiment of the disclosure.

FIG. 4 is a flow diagram of a method for determining a backup pixel block according to an embodiment of the disclosure. As shown in FIG. 4, the backup pixel block can be determined through the following step 1042 to step 1044.

Step 1042: determining multiple candidate pixel blocks with same size of the inpainting pixel blocks in the region outside the inpainting region within the image.

In some embodiments of the disclosure, multiple pixel blocks with the same shape of the inpainting pixel block can be determined from the region outside the inpainting region within the whole image as candidate pixel blocks. Multiple pixel blocks with the same size of the inpainting pixel block can also be selected from the region outside the inpainting region in the local region based on a preset pixel block selection rule, and are taken as candidate pixel blocks.

The preset pixel block selection rule can be that: the pixel blocks can be selected randomly, can also be selected uniformly according to a preset interval, can also be selected based on an offset which is preset relative to the inpainting pixel block, or can also be selected by traversing the whole region.

Step 1043: determining the similarity of each candidate pixel block to the inpainting pixel block.

In some embodiments, the second feature vector of each candidate pixel block and the first feature vector of the inpainting pixel block can be acquired firstly, the similarity is determined based on the first feature vector and the second feature vector, and the candidate pixel block with the highest similarity is determined as a backup pixel block. The feature vector can be color feature vector, and can also be a texture feature vector, and the similarity between the above feature vectors can be determined through such algorithms as Pearson correlation coefficient, Euclidean distance, Manhattan distance, and mahalanobis distance.

In some embodiments of the disclosure, the temporary pixel value of the second type pixels in the inpainting pixel block can also be determined based on the pixel value of the third type pixels in the inpainting pixel block, the first feature vector of the inpainting pixel block is obtained based on the temporary pixel values of the second type pixels and the pixel values of the third type pixels, the second feature vector of each candidate pixel block is determined based on the pixel values of the pixels in each candidate pixel block, and the similarity between the first feature vector and the second feature vector is determined as the similarity between the candidate pixel block and the inpainting pixel block.

The second type pixels are non-inpainted pixels among the inpainting pixels in the inpainting pixel block, and the third type pixels are the pixels other than the second type pixels in the inpainting pixel block.

In some embodiments, the temporary pixel value of the second type pixel can be obtained through calculating the average value of the pixel values of the third type pixels, or can also be obtained through a weighting calculation of the pixel values of the third type pixels.

Step 1044: determining the candidate pixel block with the highest similarity of the inpainting pixel block as a backup pixel block of the inpainting pixel block.

In some embodiments of the disclosure, when determining a backup pixel block, the pixel blocks with the same shape as the inpainting pixel block can be traversed in the image in a preset order, the similarity of each of the pixel blocks to the inpainting pixel block is determined, and when the similarity obtained reaches a similarity threshold, the pixel block is selected as a backup pixel block. When the whole image is traversed and still no pixel block with the similarity reaching a similarity threshold is obtained, then the pixel block with the highest similarity is selected as a backup pixel block. The above preset order can be an order based on which traversing is performed from the center to the periphery, or can also be an order based on which the Z-shaped traversing is performed from the upper left corner of the image, which is not defined in the disclosure.

In some embodiments of the disclosure, a pixel block configured to inpaint the inpainting pixel block and with an edge strength of the content edge pixel in the pixel block being smaller than a preset edge threshold can be determined as a backup pixel block.

The content edge pixel is the edge pixel in the pixel block.

Specifically, edge detection can be firstly performed on the image, to obtain an edge region in the image and the edge strength of the content edge pixel in the edge region, when the edge strength reaches a preset edge threshold, the edge region is determined to be a strong edge region, and when determining a backup pixel block, the backup pixel block should be selected from the region outside the strong edge region. Edge detection can also be performed on the backup pixel block after a backup pixel block is obtained, to obtain the edge strength of the content edge pixel in the backup pixel block. If the edge strength is smaller than a preset edge threshold, the backup pixel block is considered to satisfy requirements, and if the edge strength of the content edge pixel of the backup pixel block reaches an edge threshold, the backup pixel block is not considered to satisfy the requirements, and a backup pixel block should be selected again. The edge detection can be performed on the image based on an edge detection operator, for example, the edge detection operator can be a Sobel operator, a Roberts operator, a Log operator or a Canny operator.

Since hairline, wrinkles, and organ edges and other edge pixels with strong edge strength may exist in the inpainting pixel block, with the above solution, the interference of edge pixels in the backup pixel block to the inpainting pixel block may be eliminated.

Figure 5:
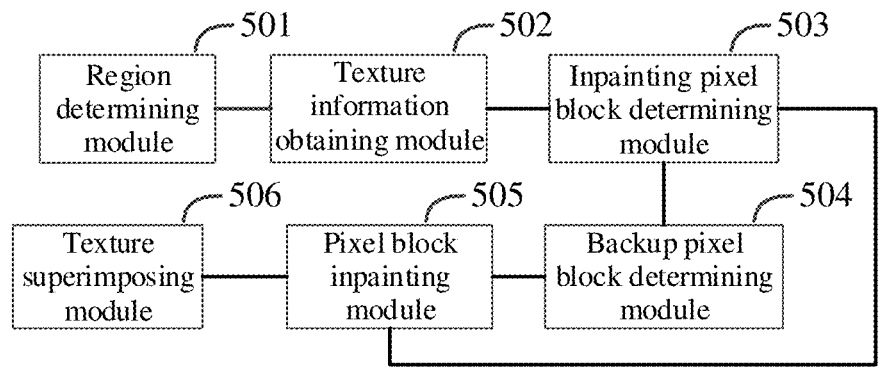
FIG. 5 is a schematic structural diagram of a device for inpainting an image according to an embodiment of the disclosure.

FIG. 5 is a block diagram of a device for inpainting an image. Refer to FIG. 5, the device includes: a region determining module 501, configured to determine an inpainting region of the image, wherein the inpainting region includes a defective region; a texture information obtaining module 502, configured to obtain original texture information of the inpainting region; an inpainting pixel block determining module 503, configured to determine the inpainting pixel blocks, wherein the inpainting pixel blocks include inpainting pixels and first type pixels; a backup pixel block determining module 504, configured to determine backup pixel blocks; a pixel block inpainting module 505, configured to inpaint all inpainting pixels in the inpainting pixel blocks based on the backup pixel blocks; a texture superimposing module 506, configured to superimpose the texture information in the inpainting region. The backup pixel blocks are determined in a region outside the inpainting region within the image, and the first type pixels include region edge pixels on the outside of the inpainting region and the inpainted pixels.

In some embodiment of the present disclosure, the pixel block inpainting module 505 is configured to: in response to that the inpainting pixel blocks include the inpainted pixels, to inpaint again the inpainted pixels by weighting pixel values of pixels in the backup pixel blocks and pixel values of the inpainted pixels.

In some embodiments of the disclosure, the pixel block inpainting module 505 is configured to: inpaint non-inpainted pixels in the inpainting pixel blocks based on pixel values of pixels in the backup pixel blocks.

In some embodiments of the disclosure, the inpainting pixel block determining module 503 is configured to: determine the first type pixels of the inpainting pixel blocks based on first type pixels in a previous inpainted pixel block and a preset order of the inpainting pixels; determine whether the first type pixels have been inpainted; in response to that the first type pixels have been inpainted, redetermine the first type pixels in the inpainting pixel block; and in response to that the first type pixels do not have been inpainted, determine the inpainting pixel blocks.

In some embodiments of the disclosure, the backup pixel block determining module 504 is configured to determine a first number of the inpainting pixels in the inpainting region; determine a second number based on the first number, wherein the second number is larger than the first number; determine a local region based on the second number, wherein the local region includes the inpainting region and includes the second number of pixels; determine the backup pixel blocks in a region outside the inpainting region in the local region.

Figure 6:
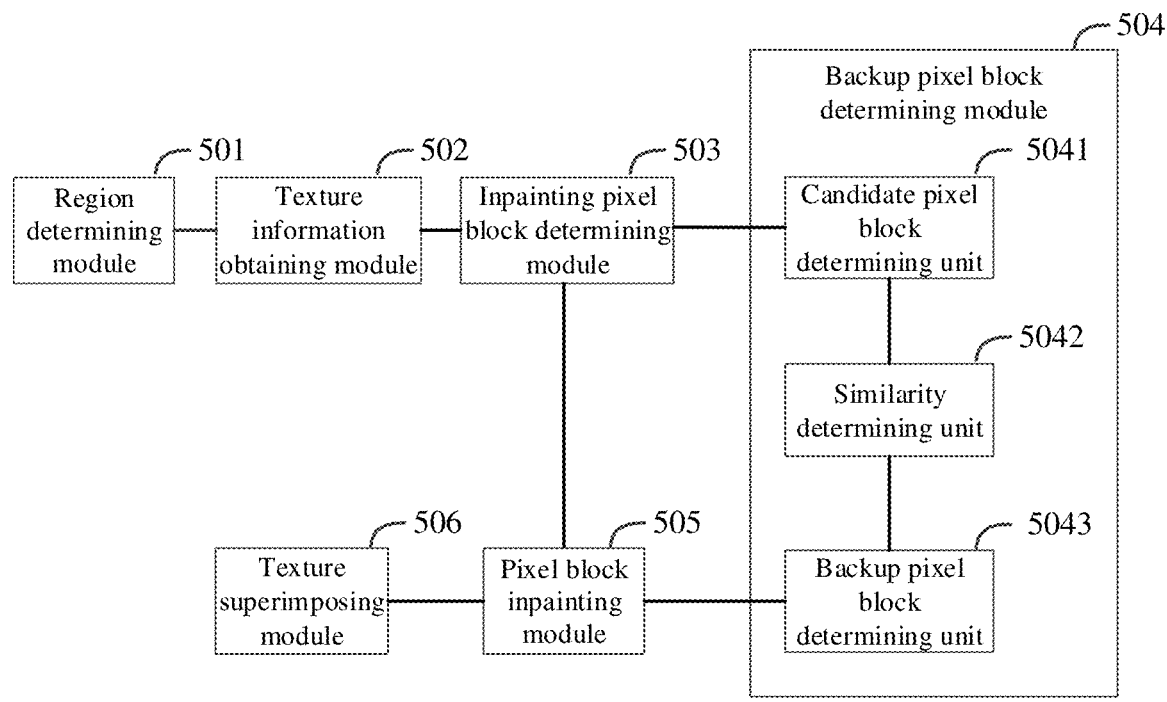
FIG. 6 is a schematic structural diagram of another device for inpainting an image according to an embodiment of the disclosure.

FIG. 6 is a schematic structural diagram of another device for inpainting an image according to some embodiments of the disclosure. As shown in FIG. 6, the backup pixel block determining module 504 includes: a candidate pixel block determining unit 5041, a similarity determining unit 5042, and a backup pixel block determining unit 5043. The candidate pixel block is configured to: determine multiple candidate pixel blocks with same size of the inpainting pixel block in the region outside the inpainting region within the image; The similarity determining unit 5042 is configured to determining a similarity of each candidate pixel block to the inpainting pixel block; and the backup pixel block unit 5042 is configured to determine the backup pixel block based on the candidate pixel block with a highest similarity.

In some embodiments of the disclosure, the similarity determining unit 5042 is configured to: determine pixel values of second type pixels in the inpainting pixel block based on pixel values of third type pixels in the inpainting pixel block, wherein the second type pixels are non-inpainted pixels among the inpainting pixels in the inpainting pixel block, and the third type pixels are pixels other than the second type pixels in the inpainting pixel block; determine a first feature vector of the inpainting pixel block based on the pixel values of the second type pixels and the pixel values of the third type pixels; obtain a second feature vector of the candidate pixel block based on pixel values of pixels in the candidate pixel block; and determine the similarity based on the first feature vector and the second feature vector.

In some embodiments of the disclosure, the backup pixel block determining module 504 is configured to: determine the backup pixel blocks with an edge strength smaller than preset edge threshold.

In some embodiments of the disclosure, the texture superimposing module 506 is configured to: superimpose the original texture information in the inpainting region based on a pixel matrix, a texture matrix, and a preset superposition coefficient, wherein a value of each element in the pixel matrix is a pixel value of a pixel located at a same position as said element in the inpainting region, and a value of each element in the texture matrix is an original texture information of an inpainting pixel located at a same position as said element in the inpainting region.

When inpainting the image with solution according to the above embodiment, the inpainting region of the image is determined, the original texture information of the inpainting region is obtained, and then the steps of determining the inpainting pixel blocks, determining backup pixel blocks, configured to inpaint the inpainting pixel blocks, and inpainting pixels in the inpainting pixel block based on the backup pixel block are performed, until all inpainting pixels in the inpainting region are inpainted, and then the texture information is superimposed in the inpainting region. In one aspect, in the solution according to the embodiment of the disclosure, the inpainting region of the image is inpainted through inpainting the pixel block as a whole, and the original texture in the pixel block can be retained. In another aspect, in the solution according to the embodiment of the disclosure, texture information is superimposed in the inpainting region, such that the texture of the inpainting region is strong in sense of reality. Thus, when the image is inpainted with the image inpainting solution according to the embodiment of the disclosure, the texture of the inpainted image is rich and the sense of reality is strong.

As to the device in the above embodiments, specific operating manners of each module have been described in detail in the embodiments of the method, and will not be explained in detail herein.

Figure 7:
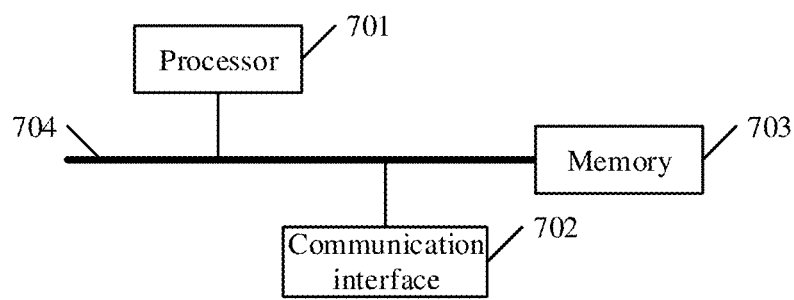
FIG. 7 is a schematic structural block diagram of electronic equipment according to an embodiment of the disclosure.

An embodiment of the present disclosure further provides electronic equipment. FIG. 7 is a schematic structural block diagram of electronic equipment according to some embodiments of the disclosure. The electronic equipment includes a processor 701, a communication interface 702, a memory 703 and a communication bus 704, wherein the processor 701, the communication interface 702 and the memory 703 communicate with each other through the communication bus 704.

The memory 703 is configured to store instructions executable by the processor 701. The processor is configured to execute the instructions to: determine an inpainting region of the image, wherein the inpainting region includes a defective region; obtain original texture information of the inpainting region; determine inpainting pixel blocks and backup pixel blocks, wherein the inpainting pixel blocks include inpainting pixels and first type pixels; inpaint all inpainting pixels of the inpainting pixel blocks based on the backup pixel blocks; superimpose the original texture information in the inpainting region; wherein the backup pixel blocks are determined in a region outside the inpainting region within the image, and the first type pixels include region edge pixels on the outside of the inpainting region and inpainted pixels.

In some embodiments, the processor is configured: in response to that the inpainting pixel blocks include the inpainted pixels, to inpaint again the inpainted pixels by weighting pixel values of pixels in the backup pixel blocks and pixel values of the inpainted pixels.

In some embodiments, the processor is configured to: inpaint non-inpainted pixels in the inpainting pixel blocks based on pixel values of pixels in the backup pixel blocks.

In some embodiments of the disclosure, the processor is configured to: determine the first type pixels of the inpainting pixel blocks based on first type pixels in a previous inpainted pixel block and a preset order of the inpainting pixels; determine whether the first type pixels have been inpainted; in response to that the first type pixels have been inpainted, redetermine the first type pixels in the inpainting pixel block; and in response to that the first type pixels do not have been inpainted, determine the inpainting pixel blocks.

In some embodiments, the processor is configured to: determine a first number of the inpainting pixels in the inpainting region; determine a second number based on the first number, wherein the second number is larger than the first number; determine a local region based on the second number, wherein the local region includes the inpainting region and includes the second number of pixels; determine the backup pixel blocks in a region outside the inpainting region in the local region.

In some embodiments, the processor is configured to: determine multiple candidate pixel blocks with same size of the inpainting pixel blocks in the region outside the inpainting region within the image; determine a similarity of each candidate pixel block to the inpainting pixel block; and determine the backup pixel block based on the candidate pixel block with a highest similarity.

In some embodiments, the processor is configured to: determine pixel values of second type pixels in the inpainting pixel block based on pixel values of third type pixels in the inpainting pixel block, wherein the second type pixels are non-inpainted pixels among the inpainting pixels in the inpainting pixel block, and the third type pixels are pixels other than the second type pixels in the inpainting pixel block; determine a first feature vector of the inpainting pixel block based on the pixel values of the second type pixels and the pixel values of the third type pixels; obtain a second feature vector of the candidate pixel block based on pixel values of pixels in the candidate pixel block; and determine the similarity based on the first feature vector and the second feature vector.

In some embodiments, the processor is configured to: determine the backup pixel blocks with an edge strength smaller than preset edge threshold.

In some embodiments, the processor is configured to superimpose the original texture information in the inpainting region based on a pixel matrix, a texture matrix, and a preset superposition coefficient, wherein a value of each element in the pixel matrix is a pixel value of a pixel located at a same position as said element in the inpainting region, and a value of each element in the texture matrix is an original texture information of an inpainting pixel located at a same position as said element in the inpainting region.

In some embodiments, the communication bus in the above electronic equipment can be a peripheral component interconnect (PCI) bus or an extended industry standard architecture (EISA) bus, etc. The communication bus can be divided into an address bus, a data bus, a control bus and the like. To facilitate representation, the bus is only represented by a bold line in the figure, however, it does not mean that only one bus or one type of bus in the embodiment.

The communication interface is configured for communication between the above electronic equipment and other devices.

The memory can include a random access memory (RAM), and can also include a non-volatile memory (NVM), for example, at least one magnetic disk memory. In some embodiments, the memory can be at least one storage device away from the above processor.

The processor can be a general-purpose processor, including a central processing unit (CPU), and a network processor (NP), etc., and can also be a digital signal processor (DSP), an application specific integrated circuit (ASIC), a field-programmable gate array (FPGA) or other programmable logic devices, discrete gates or transistor logic devices, and discrete hardware components.

In another embodiment provided in the present disclosure, a computer readable storage medium is further provided. The computer readable storage medium is internally stored with computer programs, and the computer programs perform the steps of any of the above image repairing methods when being executed by the processor.

In still another embodiment provided in the present disclosure, a computer program product containing instructions is further provided, and when the computer program product runs on the computer, the computer is enabled to perform any of the image inpainting methods in the above embodiments.

When inpainting the image with image inpainting solution according to the above embodiment, the inpainting region of the image is determined, the original texture information of the inpainting region is obtained, and then the steps of determining the inpainting pixel blocks, determining backup pixel blocks, configured to inpaint the inpainting pixel blocks, and inpainting all pixels in the inpainting pixel block based on the pixels in the backup pixel block are performed, until all inpainting pixels in the inpainting region are inpainted, and then the texture information is superimposed in the inpainting region. In one aspect, in the solution according to the embodiment of the disclosure, the inpainting region of the image is inpainted through inpainting the pixel block as a whole, and the original texture in the pixel block can be retained. In another aspect, in the solution according to the embodiment of the disclosure, texture information is superimposed in the inpainting region, such that the texture of the inpainting region is strong in sense of reality. Thus, when the image is inpainted with the image inpainting solution according to the embodiment of the disclosure, the texture of the inpainted image is rich and the sense of reality is strong.

Through the electronic equipment, the readable storage medium and the computer program product provided in embodiments of the present disclosure, the image repairing method provided in an embodiment of the present disclosure can be rapidly and accurately realized. It can be seen that, when an image is inpainted with the image repairing solution provided in the above embodiment, the inpainted image is rich in texture and strong in sense of reality.

The above embodiments can be completely or partially realized through software, hardware, firmware or any combination thereof. When the above embodiments are realized through software, they can be completely or partially realized in the form of computer program products. The computer program products include one or more computer instructions. When the computer program instructions are loaded and executed on the computer, the flows or functions according to the embodiments of the present disclosure can be completely or partially generated. The computer can be a general-purpose computer, a special-purpose computer, a computer network or other programmable devices. The computer instructions can be stored in the computer readable storage medium, or can be transmitted from one computer readable storage medium to another computer readable storage medium, for example, the computer instructions can be transmitted from a website, a computer, a server or a data center to another website, computer, server or data center through a wired (for example, a coaxial cable, an optical fiber, a digital subscriber line (DSL)) manner or a wireless (for example, infrared, wireless or microwave) manner. The computer readable storage medium can be any available medium accessible by a computer or a data storage device such as a server or a data center which contains an integration of one or more available media. The available medium can be a magnetic medium (for example, a floppy disk, a hard disk, a magnetic tape), an optical medium (for example, DVD), or a semiconductor medium (for example, a solid state disk (SSD)), etc.

It should be noted that, in the text, relational terms such as first and second are merely used to distinguish one entity or operation from another entity or operation, and do not necessarily require or imply any such actual relationship or order between these entities or operations. Moreover, the terms "including" and "include" or any other variant thereof are intended to cover non-exclusive inclusion, such that the process, method, item or equipment which includes a series of elements not only includes those elements, but also includes other elements which are not clearly listed, or further includes the elements inherent to the process, method, item or equipment. In the absence of more restrictions, the statement "includes a . . . " does not preclude the existence of additional identical elements in the process, method, item or equipment including the elements.

All the embodiments in the present description are described in relevant manners, the same and similar parts among each embodiment can be referred to each other, and each embodiment focuses on the difference from other embodiments. In particular, as to the device embodiments, electronic equipment embodiments, computer readable storage medium embodiments, and computer program product embodiments, the description is relatively simple since they are basically similar to the method embodiments. For the relevant parts, please refer to the descriptions of the method embodiments.

The embodiments described above are merely preferred embodiments of the present disclosure, rather than for limiting the protection scope of the disclosure. Any modification, equivalent substitution or improvement made without departing from the spirit and principle of the disclosure shall all fall within the protection scope of the disclosure.

What is claimed is:

1. A method for inpainting an image, comprising:
  determining an inpainting region of the image, wherein the inpainting region comprises a defective region;
  obtaining original texture information of the inpainting region;
  determining inpainting pixel blocks and backup pixel blocks, wherein the inpainting pixel blocks comprise inpainting pixels and first type pixels;
  inpainting all inpainting pixels of the inpainting pixel blocks based on the backup pixel blocks; and
  superimposing the original texture information in the inpainting region;
  wherein the backup pixel blocks are determined in a region outside the inpainting region within the image, and the first type pixels comprise region edge pixels on the outside of the inpainting region and inpainted pixels; and
  wherein said determining of the inpainting pixel blocks comprises:
    determining the first type pixels of the inpainting pixel block based on first type pixels in a previous inpainted pixel block and a preset order of the inpainting pixels;
    determining whether the first type pixels have been inpainted;
    in response to the first type pixels having been inpainted, redetermining the first type pixels in the inpainting pixel block; and
    in response to the first type pixels having not been inpainted, determining the inpainting pixel block.

2. The method of claim 1, wherein said inpainting all inpainting pixels of the inpainting pixel blocks based on the backup pixel blocks comprises:
  in response to the inpainting pixel blocks comprising the inpainted pixels, inpainting again the inpainted pixels by weighting pixel values of pixels in the backup pixel blocks and pixel values of the inpainted pixels.

3. The method of claim 1, wherein said inpainting all inpainting pixels of the inpainting pixel blocks based on the backup pixel blocks comprises:
  inpainting non-inpainted pixels in the inpainting pixel blocks based on pixel values of pixels in the backup pixel blocks.

4. The method of claim 1, wherein said determining the back pixel blocks comprises:
  determining a first number of the inpainting pixels in the inpainting region;
  determining a second number based on the first number, wherein the second number is larger than the first number;
  determining a local region based on the second number, wherein the local region comprises the inpainting region and comprises the second number of pixels;
  determining the backup pixel blocks in a region outside the inpainting region in the local region.

5. The method of claim 1, wherein said determining the backup pixel blocks comprises:
  determining multiple candidate pixel blocks with same size of the inpainting pixel block in the region outside the inpainting region within the image;
  determining a similarity of each candidate pixel block to the inpainting pixel block; and
  determining the backup pixel block based on the candidate pixel block with a highest similarity.

6. The method of claim 5, wherein said determining the similarity of each candidate pixel block to the inpainting pixel block comprises:
  determining pixel values of second type pixels in the inpainting pixel block based on pixel values of third type pixels in the inpainting pixel block, wherein the second type pixels are non-inpainted pixels among the inpainting pixels in the inpainting pixel block, and the third type pixels are pixels other than the second type pixels in the inpainting pixel block;
  determining a first feature vector of the inpainting pixel block based on the pixel values of the second type pixels and the pixel values of the third type pixels;
  determining a second feature vector of the candidate pixel block based on pixel values of pixels in the candidate pixel block; and
  determining the similarity based on the first feature vector and the second feature vector.

7. The method of claim 1, wherein said determining the backup pixel blocks comprises:
  determining the backup pixel blocks with an edge strength smaller than preset edge threshold.

8. The method of claim 1, wherein said superimposing the original texture information in the inpainting region comprises:
  superimposing the original texture information in the inpainting region based on a pixel matrix, a texture matrix, and a preset superposition coefficient, wherein a value of each element in the pixel matrix is a pixel value of a pixel located at a same position as said element in the inpainting region, and a value of each element in the texture matrix is an original texture information of an inpainting pixel located at a same position as said element in the inpainting region.

9. A device for inpainting an image, comprising:
  a processor; and
  a memory configured to store instructions executable by the processor;
  wherein the processor is configured to execute the instructions to:
  determine an inpainting region of the image, wherein the inpainting region comprises a defective region;
  obtain original texture information of the inpainting region;
  determine inpainting pixel blocks and backup pixel blocks, wherein the inpainting pixel blocks comprise inpainting pixels and first type pixels;
  inpaint all inpainting pixels of the inpainting pixel blocks based on the backup pixel blocks;
  superimpose the original texture information in the inpainting region;
  wherein the backup pixel blocks are determined in a region outside the inpainting region within the image, and the first type pixels comprise region edge pixels on the outside of the inpainting region and inpainted pixels;
  wherein the processor is configured to:
    determine the first type pixels of the inpainting pixel blocks based on first type pixels in a previous inpainted pixel block and a preset order of the inpainting pixels;
    determine whether the first type pixels have been inpainted;
    in response to the first type pixels having been inpainted, redetermine the first type pixels in the inpainting pixel block; and in response to the first type pixels having not been inpainted, determine the inpainting pixel block.

10. The device of claim 9, wherein the processor is configured:
in response to the inpainting pixel blocks comprising the inpainted pixels, to inpaint again the inpainted pixels by weighting pixel values of pixels in the backup pixel blocks and pixel values of the inpainted pixels.

11. The device of claim 9, wherein the processor is configured to:
inpaint non-inpainted pixels in the inpainting pixel blocks based on pixel values of pixels in the backup pixel blocks.

12. The device of claim 9, wherein the processor is configured to:
determine a first number of the inpainting pixels in the inpainting region;
determine a second number based on the first number, wherein the second number is larger than the first number;
determine a local region based on the second number, wherein the local region comprises the inpainting region and comprises the second number of pixels;
determine the backup pixel blocks in a region outside the inpainting region in the local region.

13. The device of claim 9, wherein the processor is configured to:
determine multiple candidate pixel blocks with same size of the inpainting pixel blocks in the region outside the inpainting region within the image;
determine a similarity of each candidate pixel block to the inpainting pixel block; and
determine the backup pixel block based on the candidate pixel block with a highest similarity.

14. The device of claim 13, wherein the processor is configured to:
determine pixel values of second type pixels in the inpainting pixel block based on pixel values of third type pixels in the inpainting pixel block, wherein the second type pixels are non-inpainted pixels among the inpainting pixels in the inpainting pixel block, and the third type pixels are pixels other than the second type pixels in the inpainting pixel block;
determine a first feature vector of the inpainting pixel block based on the pixel values of the second type pixels and the pixel values of the third type pixels;
determine a second feature vector of the candidate pixel block based on pixel values of pixels in the candidate pixel block; and
determine the similarity based on the first feature vector and the second feature vector.

15. The device of claim 9, wherein the processor is configured to:
determine the backup pixel blocks with an edge strength smaller than preset edge threshold.

16. The device of claim 9, wherein the processor is configured to:
superimpose the original texture information in the inpainting region based on a pixel matrix, a texture matrix, and a preset superposition coefficient, wherein a value of each element in the pixel matrix is a pixel value of a pixel located at a same position as said element in the inpainting region, and a value of each element in the texture matrix is an original texture information of an inpainting pixel located at a same position as said element in the inpainting region.

17. A non-transitory computer readable storage medium storing computer programs that, when executed by a processor, cause the processor to perform the operation of:
determining an inpainting region of the image, wherein the inpainting region comprises a defective region;
obtaining original texture information of the inpainting region;
determining inpainting pixel blocks and backup pixel blocks, wherein the inpainting pixel blocks comprise inpainting pixels and first type pixels;
inpainting all inpainting pixels of the inpainting pixel blocks based on the backup pixel blocks;
superimposing the original texture information in the inpainting region;
wherein the backup pixel blocks are determined in a region outside the inpainting region within the image, and the first type pixels comprise region edge pixels on the outside of the inpainting region and inpainted pixels;
wherein the processor is further caused to perform the operation of:
determining the first type pixels of the inpainting pixel block based on first type pixels in a previous inpainted pixel block and a preset order of the inpainting pixels;
determining whether the first type pixels have been inpainted;
in response to the first type pixels having been inpainted, redetermining the first type pixels in the inpainting pixel block; and
in response to the first type pixels having not been inpainted, determining the inpainting pixel block.

* * * * *